United States Patent
Khosrowpour et al.

(10) Patent No.: US 10,564,702 B2
(45) Date of Patent: Feb. 18, 2020

(54) METHOD TO OPTIMIZE CORE COUNT FOR CONCURRENT SINGLE AND MULTI-THREAD APPLICATION PERFORMANCE

(71) Applicant: Dell Products L.P., Round Rock, TX (US)

(72) Inventors: Farzad Khosrowpour, Pflugerville, TX (US); Mitchell A. Markow, Hutto, TX (US); Steven A. Sexton, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 15/636,021

(22) Filed: Jun. 28, 2017

(65) Prior Publication Data

US 2019/0004861 A1    Jan. 3, 2019

(51) Int. Cl.
*G06F 1/3287* (2019.01)
*G06F 9/50* (2006.01)

(52) U.S. Cl.
CPC .......... *G06F 1/3287* (2013.01); *G06F 9/5027* (2013.01); *G06F 2209/503* (2013.01); *G06F 2209/5018* (2013.01)

(58) Field of Classification Search
CPC ................ G06F 9/5027; G06F 1/3287; G06F 2009/5018; G06F 2009/503; G06F 1/329
See application file for complete search history.

(56) References Cited

U.S. PATENT DOCUMENTS

| | | | |
|---|---|---|---|
| 8,429,656 B1* | 4/2013 | Duluk, Jr. | G06F 9/5027 718/102 |
| 8,683,243 B2 | 3/2014 | Wu et al. | |
| 8,892,916 B2 | 11/2014 | Bieswanger et al. | |
| 2009/0328055 A1* | 12/2009 | Bose | G06F 1/3203 718/105 |
| 2016/0306416 A1* | 10/2016 | Browne | G06F 1/3228 |
| 2017/0060635 A1* | 3/2017 | Wu | G06F 9/5011 |

* cited by examiner

*Primary Examiner* — Jacob D Dascomb
(74) *Attorney, Agent, or Firm* — Terrile, Cannatti & Chambers; Stephen A. Terrile

(57) ABSTRACT

A system, method, and computer-readable medium are disclosed for performing a core optimization operation, comprising: enabling all of a plurality of processor cores of a processor; selectively turning off at least one of the plurality of processor cores, the selectively turning off the at least one of the plurality of processor cores being based upon an application to be executed by the processor, the selectively turning off being performed dynamically during runtime of the processor; and, controlling process thread distribution to the plurality of processor cores via an operating system executing on the processor, the process thread distribution not distributing threads to the turned off at least one of the plurality of processor cores.

18 Claims, 5 Drawing Sheets

METHOD TO OPTIMIZE CORE COUNT FOR CONCURRENT SINGLE AND MULTI-THREAD APPLICATION PERFORMANCE

BACKGROUND OF THE INVENTION

Field of the Invention

The present invention relates to information handling systems. More specifically, embodiments of the invention relate to performing a core optimization operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with one or more multi-core processors.

SUMMARY OF THE INVENTION

A system, method, and computer-readable medium are disclosed for performing a core optimization operation. In certain embodiments, the core optimization operation dynamically changes a core count for a particular application during runtime. In certain embodiments, when performing the core optimization operation, all processor threads are initially enabled; however, the core optimization operation can selectively turn off certain threads of the processor. When the information handling system is in operation, process thread distribution is controlled via the operating system. The operating system defaults to honor the setting by not using the threads which are turned off by the core optimization operation. The core optimization operation can then change previously turned off threads at runtime thereby resulting in mixed mode (i.e., logical and physical) enablement of processor cores for both single and multi-thread applications without needing to reboot the information handling system. If a thread in a hyper-thread (HT) core in not utilized, the processor is functionally equivalent to a single physical core processor with no wasted system resources.

In certain embodiments, the core optimization operation includes a core affinity management operation. In certain embodiments, the core affinity management operation restricts schedule of threads onto a particular core when hyper-threading is disabled. In certain embodiments, the core affinity management operation removes (i.e., drains) the threads and associated memory mapping from a particular core (e.g., CoreN) and redistributes the threads to other available cores. Removing the threads and associated memory causes the particular core (CoreN) to naturally transition to a sleep state, hence preserving power. If a lower priority apps can sufficiently execute on a predetermined number of cores (e.g., cores 1-3), there is no need to bring core N out of sleep state, where the predetermined number of cores is fewer than the total number of cores available. Certain types of applications can execute very slowly in the background when the application is not identified as a higher priority application or when the application does not require additional processor performance to avoid performance bottlenecks. For example, anti-malware type applications (e.g., applications which perform virus scanning) can execute very slowly in the background as the performance bottleneck is usually related to storage access rather than processor performance. In certain embodiments, the application is identified as higher priority by a user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that in a multi-core system, an application may optimally run on one, all, or partial number of available cores depending on how the application is written. Various aspects of the present disclosure include an appreciation that an application may optimally run with fewer core for some functions and with more core with other functions. Various aspects of the present disclosure include an appreciation that if both single-threaded and multi-threaded applications are concurrently executed, different thread configurations may be desirable to optimally execute both applications. Various aspects of the present disclosure include an appreciation that in a multi core processor with HyperThreading (HT) capability, HT is enabled or disabled via BIOS. The users only have option to optimize the system for one or the other application by changing the HT settings. For example, if both a single threaded application and a multi-threaded application where the high priority applications, optimizing cores for one of the application could result in suboptimal performance for the other application. Additionally, because the optimization is via BIOS, a reboot is necessary each time the cores are optimized. Accordingly, it would be desirable to optimize simultaneously executing single and multi-threaded applications without manual switching (in either or both logical and physical core configurations) while optimizing performance and power. It is also desirable to enable HT to be dynamically adjusted.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
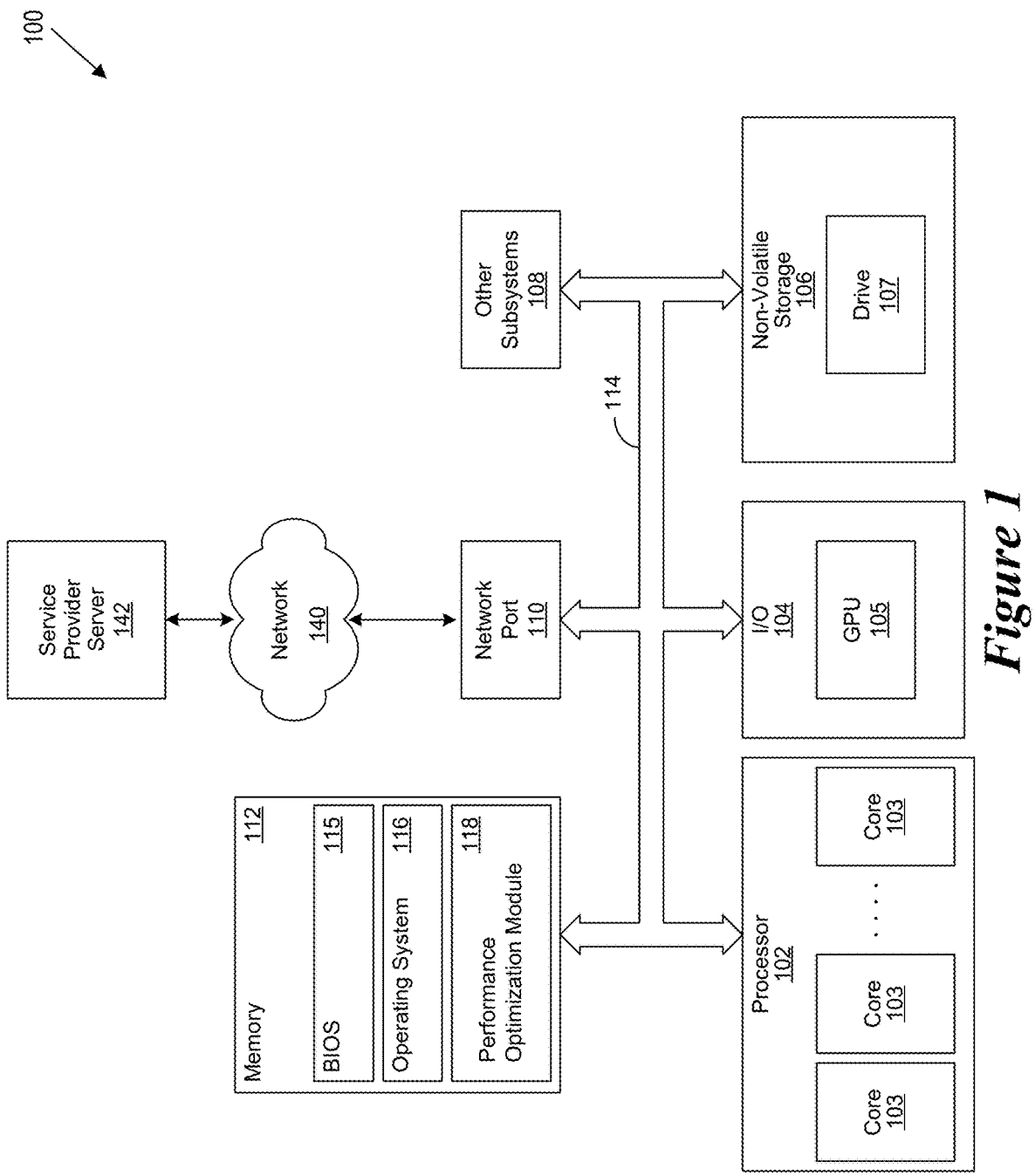
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a non-volatile storage 106, and various other subsystems 108. In various embodiments, the processor includes a plurality of processor cores 103. In various embodiments, the I/O devices 104 include a graphics processing unit (GPU) 105. In various embodiments, the non-volatile memory 106 includes a drive 107 such as a hard disk drive (HDD) and/or a solid state drive (SDD). In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises a basic input output system (BIOS) 114, an operating system (OS) 116 and in various embodiments may also comprise a core optimization module 118.

In certain embodiments, the core optimization module 118 performs a core optimization operation. In certain embodiments, the core optimization operation dynamically changes a core count for a particular application during runtime. In certain embodiments, when performing the core optimization operation, all processor threads are initially enabled; however, while the information handling system is in operation (i.e., during runtime) the core optimization operation selectively turns off certain threads of the processor. When the information handling system is in operation, process thread distribution is controlled via the operating system 116 and the core optimization module 118. The operating system 116 defaults to honor the setting by not using the threads which are turned off by the core optimization operation. The core optimization operation can then change previously turned off threads at runtime thereby resulting in mixed mode (i.e., logical and physical) enablement of processor cores for both single and multi-thread applications without needing to reboot the information handling system. If a thread in a hyper-thread (HT) core in not utilized, the processor is functionally equivalent to a single physical core processor with no wasted system resources.

In certain embodiments, the core optimization operation includes a core affinity management operation. In certain embodiments, the core affinity management operation restricts schedule of threads onto a particular core when hyper-threading is disabled. In certain embodiments, the core affinity management operation removes (i.e., drains) the threads and associated memory mapping from a particular core (e.g., CoreN) and redistributes the threads to other available cores. Removing the threads and associated memory causes the particular core (e.g., CoreN) to naturally transition to a sleep state, hence preserving power. If a lower priority apps can sufficiently execute on a predetermined number of cores (e.g., cores 1-3), there is no need to bring core N out of sleep state, where the predetermined number of cores is fewer than the total number of cores available. Certain types of applications can execute very slowly in the background when the application is not identified as a higher priority application or when the application does not require additional processor performance to avoid performance bottlenecks. For example, anti-malware type applications (e.g., applications which perform virus scanning) can execute very slowly in the background as the performance bottleneck is usually related to storage access rather than processor performance. In certain embodiments, the application is identified as higher priority by a user.

In certain embodiments, the core optimization operation balances performance among the cores. For example, in a condition when thread count is high and performance of a first application or a second application starts degrading, an additional core (e.g., core N) can be added to the execution of the application for a short time (i.e., while the operation causing the performance degradation is executing). After the performance increase completes, the core optimization operation core drains the added core. Such a core optimization operation allows the operating system to determine an optimal proportion between the logical and physical cores based on the workload.

In certain embodiments, the core optimization operation optimizes distribution of threads based upon the voltage across some or all of the threads. In certain embodiments, the core optimization operation optimizes distribution of threads based upon the frequency of operation of some or all the threads. In certain embodiments, the core optimization operation optimizes distribution of threads based upon a number of instructions executing on some or all the threads. In certain embodiments, the core optimization operation is performed dynamically. Performance of the core optimization operation is not dependent upon application knowledge and/or thread queue priorities.

As will be appreciated, once the information handling system 100 is configured to perform the core optimization operation, the information handling system 100 becomes a specialized computing device specifically configured to perform the core optimization operation and is not a general purpose computing device. Moreover, the implementation of the core optimization operation on the information handling system 100 improves the functionality of the information handling system and provides a useful and concrete result of optimizing which cores of a processor execute one or more applications. In various embodiments, the core optimization operation provides performance gain of the information handling system when compared to processors executing applications that do not have cores optimized for the application.

Figure 2:
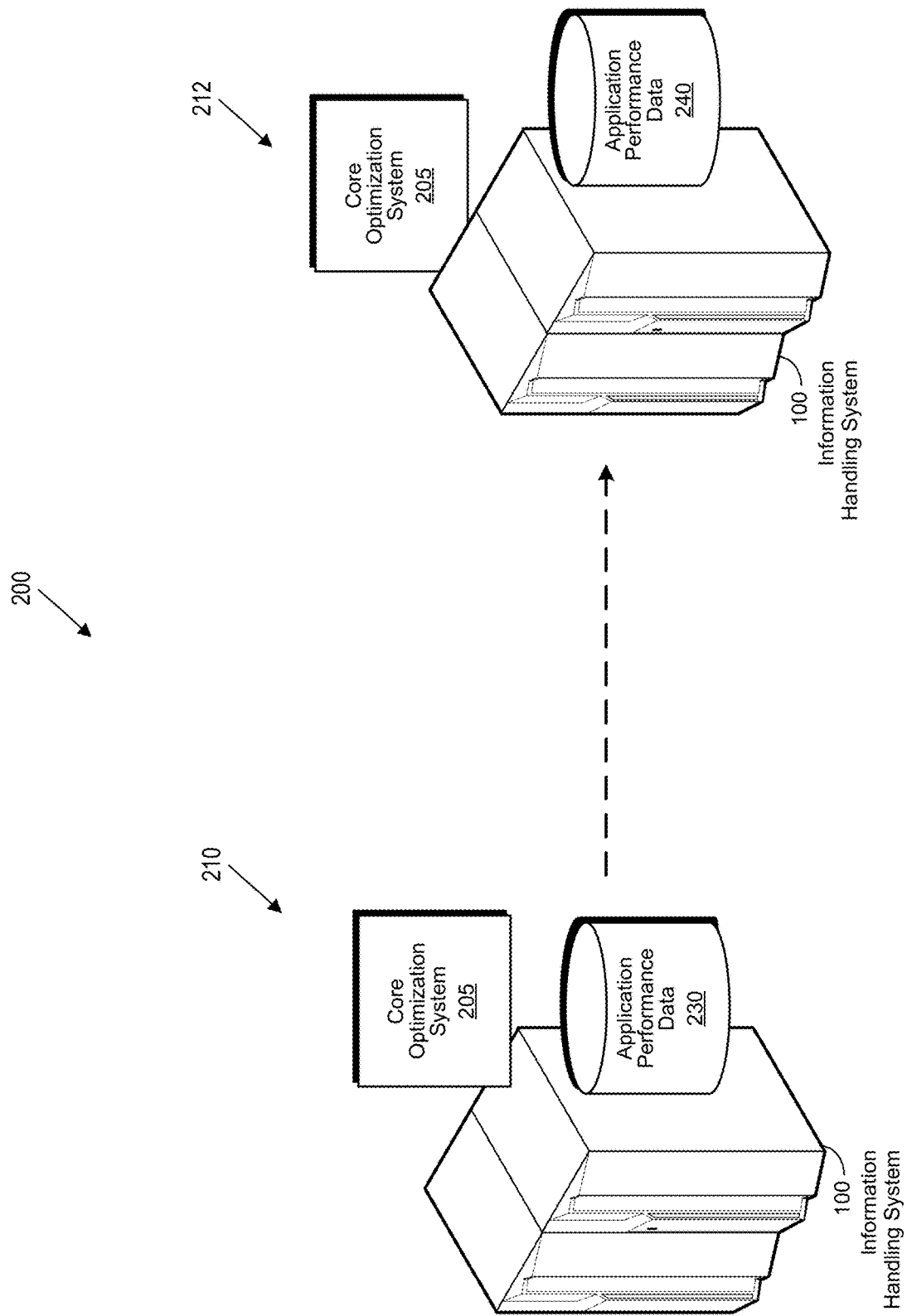
FIG. 2 shows a block diagram of a core optimization environment.

FIG. 2 shows a block diagram of a core optimization environment 200. In various embodiments, the core optimization environment 200 includes one or more core optimization systems 205. Each core optimization system 205 may perform some or all of a core optimization operation.

The core optimization environment 200 includes a developer portion 210 (which may also be a manufacturer portion) and a user portion 212. In various embodiments the developer portion 210 includes a repository of application performance data 230. In certain embodiments, the information handling system for which the performance is being optimized includes a plurality of application combinations. The user portion 212 includes an information handling system 100 which corresponds to some or all of the plurality of application combinations of the information handling system 100 from the developer portion 210. In various embodiments the user portion 212 includes a repository of application performance data 240. In certain embodiments, information contained within the repository of application performance data 240 is provided to developer portion 210.

In various embodiments, the core optimization operation analyzes one or more composite changes which can affect system performance. In various embodiments, the composite changes relate to one or more applications. In various embodiments, the composite changes relate to one or more functions within a single application. In various embodiments, the core optimization operation is dynamically performed on the information handling system 212 of the user portion during runtime without accessing the developer portion 210 (i.e., the core optimization operation is independent of the developer portion 210).

Figure 3:
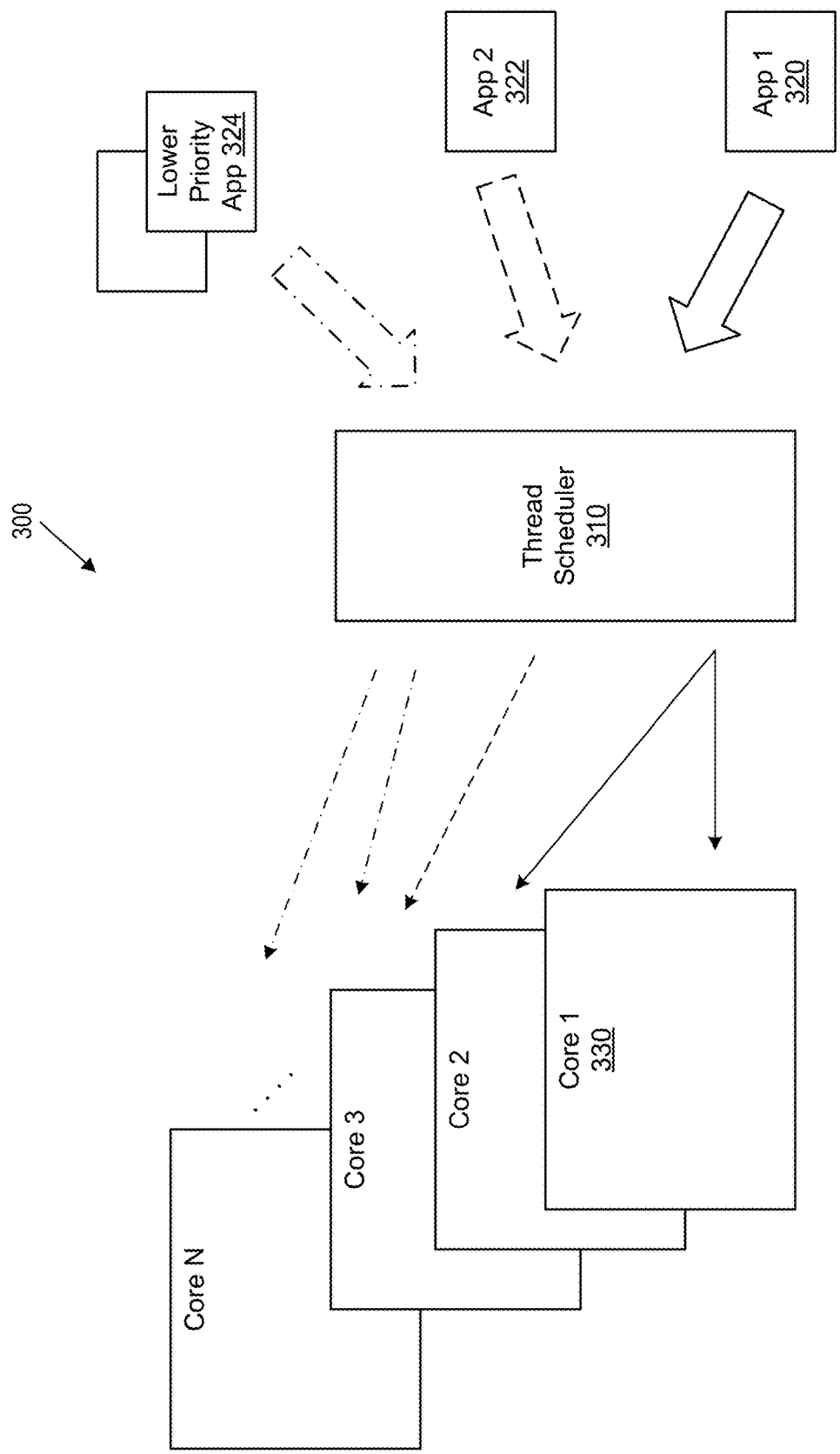
FIG. 3 shows a block diagram of a representation of core optimization operation.

FIG. 3 shows a block diagram of a representation of core optimization operation. More specifically, the core optimization system 300 includes a thread scheduler 310. The thread scheduler 310 receives information from a plurality of applications 320, 322 (App1, App2, respectively) as well as one or more lower priority applications 324. The thread scheduler provides the information to a core 330 or plurality of cores 330 of a processor.

In a multi-core system, an application may optimally execute on one, all, or a partial number of available cores depending on how the application is written. For example, with one sample application certain benchmark texts (e.g., the Bentley benchmark test) indicate that a load time improved when core count dropped to two from four, while the rendering performance dropped significantly when two cores where disabled.

In certain embodiments, the number of active cores able to be changed dynamically is important to certain applications. For example, the Autodesk Maya application, the 3 ds Max application and the Siemens NX application could each benefit from dynamically optimizing cores. For example, with certain applications, when modeling an object, the operations are single-threaded; however, when generating a photorealistic rendering, the operations are multi-threaded. Many users can switch between modeling and rendering or analysis on the same system, possibly even going back and forth between the modeling and rendering. In such cases, the first application and the second application correspond to different features of the same application software.

In cases where the processor only uses physical cores (i.e., where HT is disabled), one core (e.g., physical CoreN) may be underutilized. However due to the affinity of the threads with CoreN, the scheduler could continue to use CoreN. Hence power is consumed with marginal benefits in performance. In fact, if CoreN was not used, the speed for other cores in use could increase through the planer logic in hardware. The problem is that the system cannot "drain" core N without shutting the core off at the BIOS level requiring a reboot, and that cannot be done dynamically.

Figure 4:
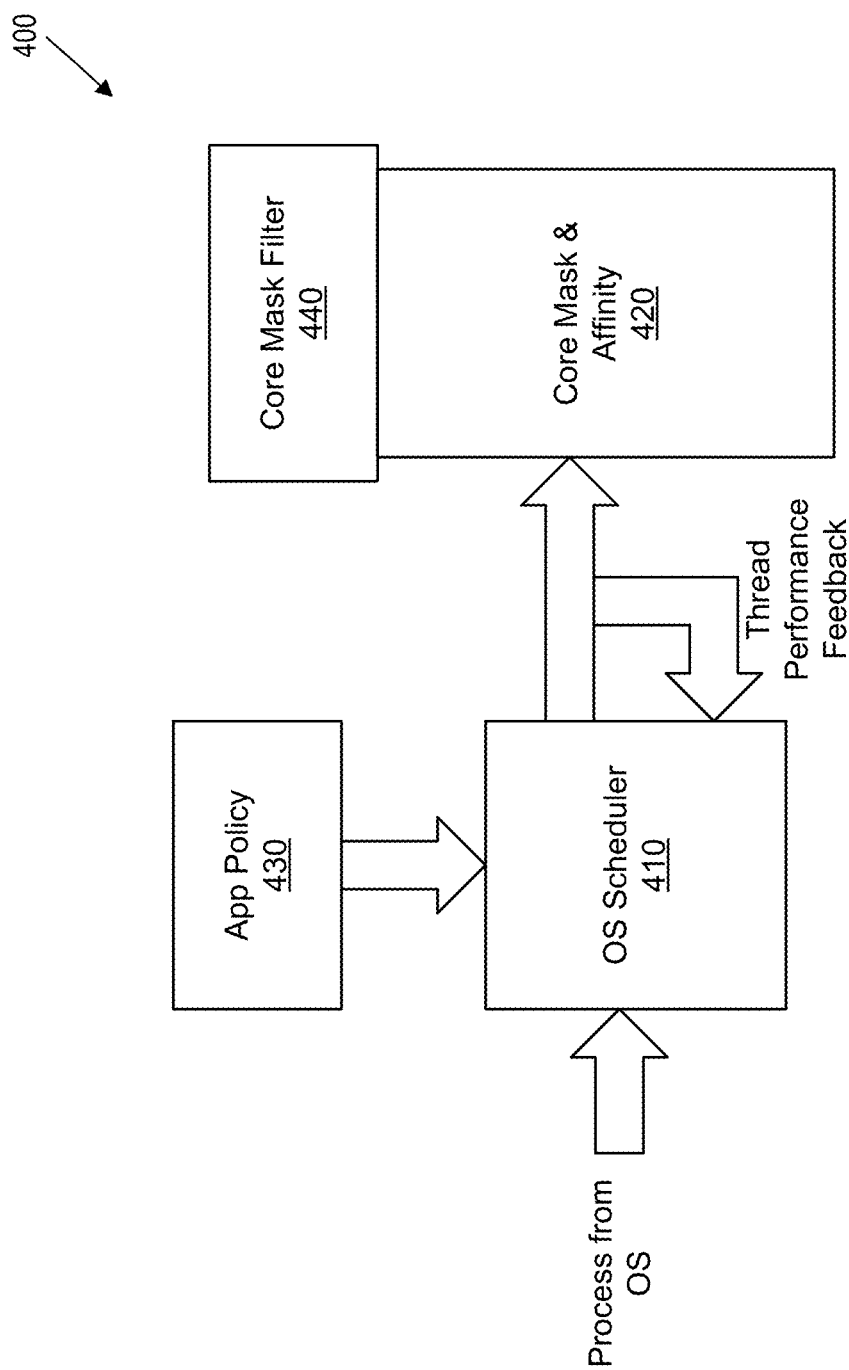
FIG. 4 shows a block diagram of a state sequence of a core optimization operation.

Referring to FIG. 4, a block diagram of a core optimization system 400 for performing a core optimization operation is shown. More specifically, the core optimization system includes an OS scheduler 410 as well as a core mask and affinity module 420. The core mask and affinity module 420 includes a bit mask indicating which cores a thread or process should be run on by the OS scheduler 410. The core optimization system also includes an application policy module 430 and a core mask filter module 440. The application policy module 430 stores information regarding various application policies for applying optimization operations to specific applications. The core mask filter module 440 stores information regarding which cores should be used for particular applications.

The OS schedule 410 receives a process from an operating system (e.g., operating system 116). The OS scheduler 410 also receives an application policy from the application policy module 430.

In operation, multiprocessor (MP) table entries and advanced power configuration and interface (ACPI) table are initialized for the application processor. The HT feature impacts the processor entries in these tables. More specifically, the MP table includes entries for the primary logical processors. The ACPI table is configured to include all logical processor entries. So configuring the processor ensures that HT enabled processors continue to function properly with legacy operating systems as well as ACPI compliant operating systems. The changes in the MP and ACPI tables reflect both logical and physical cores.

Additionally, in certain embodiments a system management base (SMBASE) register is relocated through a system management mode (SMM) operation and has a unique per logical processor entry. In certain embodiments, all logical processor SMBASE registers are initialized independently.

Figure 5:
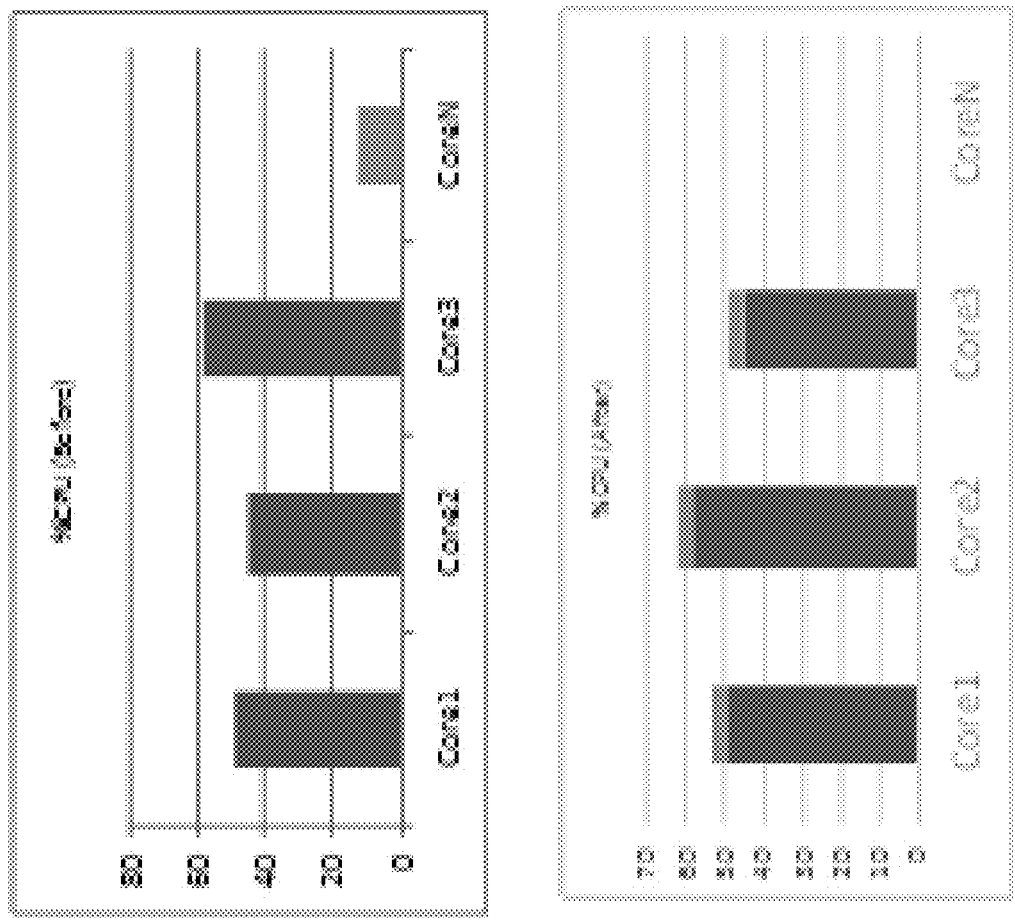
FIG. 5 shows example core utilization before and after a core optimization operation is performed.

FIG. 5 shows example core utilization before and after a core optimization operation is performed. In various embodiments, the physical cores can be enabled/disabled by hints that are provided to the operating system to balance the redistribution of the threads. Monitoring the application behavior can signal the OS scheduler the optimal distribution of the threads.

The core optimization operation can also be disabled so that the schedule returns to a normal, non-optimized mode of operation. With the normal, non-optimized mode of operation, all processor threads are turned on and the mask is assigned to none. Such a setup restores the scheduler function to normal operation without requiring a reboot.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a core optimization operation, comprising:
    enabling all of a plurality of processor cores of a processor;
    selectively turning off at least one of the plurality of processor cores, the selectively turning off the at least one of the plurality of processor cores being based upon an application to be executed by the processor, the selectively turning off being performed dynamically during runtime of the processor; and
    controlling process thread distribution to the plurality of processor cores via an operating system executing on the processor, the process thread distribution not distributing threads to the turned off at least one of the plurality of processor cores, the controlling process thread distribution comprising removing a thread and associated memory mapping from a turned off core and redistributing the thread to other available cores;
    wherein the core optimization is performed by a core optimization system, the core optimization system comprising:
        an operating system scheduler;
        a core mask filter that stores information regarding which cores should be used for particular applications; and
        a core mask and affinity module, wherein the core mask and affinity module:
            comprises a bit mask indicating cores on which the thread should run; and
            restricts execution of the thread from the turned off core to a particular one or more cores from the other available cores based on a determination of whether an application policy associated with the thread from the turned off core indicates hyper-threading is disabled.

2. The method of claim 1, wherein:
    the operating system defaults to honor a process thread distribution setting by not using the turned off at least one of the plurality of processor cores.

3. The method of claim 1, further comprising:
    turning on the turned off at least one of the plurality of processor cores at runtime, thereby resulting in a mixed mode enablement of the plurality of processor cores.

4. The method of claim 1, further comprising:
    restricting schedule of threads onto a particular core when hyper-threading is disabled via a core affinity management operation.

5. The method of claim 4, wherein:
    the core affinity management operation removes the thread and associated memory mapping from a particular core and redistributes the thread to other available cores.

6. The method of claim 5, wherein:
    removing the thread and associated memory causes the particular core to naturally transition to a sleep state.

7. A system comprising:
    a processor;
    a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

enabling all of a plurality of processor cores of a processor;

selectively turning off at least one of the plurality of processor cores, the selectively turning off the at least one of the plurality of processor cores being based upon an application to be executed by the processor, the selectively turning off being performed dynamically during runtime of the processor; and controlling process thread distribution to the plurality of processor cores via an operating system executing on the processor, the process thread distribution not distributing threads to the turned off at least one of the plurality of processor cores, the controlling process thread distribution comprising removing a thread and associated memory mapping from a turned off core, and redistributing the thread to other available cores;

wherein the core optimization is performed by a core optimization system, the core optimization system comprising:

an operating system scheduler;

a core mask filter that stores information regarding which cores should be used for particular applications; and a core mask and affinity module, wherein the core mask and affinity module:

comprises a bit mask indicating which cores on which the thread should run; and restricts execution of the thread from the turned off core to a particular one or more cores from the other available cores based on a determination of whether an application policy associated with the thread from the turned off core indicates hyper-threading is disabled.

8. The system of claim 7, wherein:
the operating system defaults to honor a process thread distribution setting by not using the turned off at least one of the plurality of processor cores.

9. The system of claim 7, wherein the instructions executable by the processor are further configured for:
turning on the turned off at least one of the plurality of processor cores at runtime, thereby resulting in a mixed mode enablement of the plurality of processor cores.

10. The system of claim 7, wherein the instructions executable by the processor are further configured for:
restricting schedule of threads onto a particular core when hyper-threading is disabled via a core affinity management operation.

11. The system of claim 10, wherein:
the core affinity management operation removes a thread and associated memory mapping from a particular core and redistributes the thread to other available cores.

12. The system of claim 11, wherein:
removing the thread and associated memory causes the particular core to naturally transition to a sleep state.

13. A non-transitory, computer-readable storage medium embodying computer program code, the computer program code comprising computer executable instructions configured for:

enabling all of a plurality of processor cores of a processor;

selectively turning off at least one of the plurality of processor cores, the selectively turning off the at least one of the plurality of processor cores being based upon an application to be executed by the processor, the selectively turning off being performed dynamically during runtime of the processor; and controlling process thread distribution to the plurality of processor cores via an operating system executing on the processor, the process thread distribution not distributing threads to the turned off at least one of the plurality of processor cores, the controlling process thread distribution comprising removing a thread and associated memory mapping from a turned off core and redistributing the thread to other available cores, wherein the core optimization is performed by a core optimization system, the core optimization system comprising:

an operating system scheduler;

a core mask filter that stores information regarding which cores should be used for particular applications; and a core mask and affinity module, wherein the core mask and affinity module:

comprises a bit mask indicating which cores on which the thread should run; and restricts execution of the thread from the turned off core to a particular one or more cores from the other available cores based on a determination of whether an application policy associated with the thread from the turned off core indicates hyper-threading is disabled.

14. The non-transitory, computer-readable storage medium of claim 13, wherein:
the operating system defaults to honor a process thread distribution setting by not using the turned off at least one of the plurality of processor cores.

15. The non-transitory, computer-readable storage medium of claim 13, wherein the computer executable instructions are further configured for:
turning on the turned off at least one of the plurality of processor cores at runtime, thereby resulting in a mixed mode enablement of the plurality of processor cores.

16. The non-transitory, computer-readable storage medium of claim 13, wherein the computer executable instructions are further configured for:
restricting schedule of threads onto a particular core when hyper-threading is disabled via a core affinity management operation.

17. The non-transitory, computer-readable storage medium of claim 16, wherein:
the core affinity management operation removes a thread and associated memory mapping from a particular core and redistributes the thread to other available cores.

18. The non-transitory, computer-readable storage medium of claim 17, wherein:
removing the thread and associated memory causes the particular core to naturally transition to a sleep state.

* * * * *